United States Patent [19]
Lake

[11] 4,142,184
[45] * Feb. 27, 1979

[54] DIGITAL MULTITONE GENERATOR FOR TELEPHONE DIALING

[75] Inventor: Don W. Lake, Cupertino, Calif.

[73] Assignee: Comdial Corporation, San Francisco, Calif.

[*] Notice: The portion of the term of this patent subsequent to Nov. 15, 1994, has been disclaimed.

[21] Appl. No.: 795,048

[22] Filed: May 9, 1977

Related U.S. Application Data

[63] Continuation of Ser. No. 587,453, Jun. 16, 1975, Pat. No. 4,058,805.

[51] Int. Cl.$^2$ .................... H03K 13/02; H04B 1/00
[52] U.S. Cl. ...................... 340/347 DA; 179/90 K; 325/38 B; 328/14
[58] Field of Search ............. 325/38 B; 340/347 DA, 340/146.2; 328/14, 137; 179/90 K; 364/729, 607

[56] References Cited

U.S. PATENT DOCUMENTS

| | | | |
|---|---|---|---|
| 3,772,678 | 11/1973 | Deschenes et al. | 325/38 B |
| 3,787,836 | 1/1974 | Hagelbarger | 340/347 DA |
| 3,813,528 | 5/1974 | Blanding | 364/729 |
| 3,831,167 | 8/1974 | Tewksbury | 340/347 DA |
| 3,839,675 | 10/1974 | Wernikoff et al. | 325/38 B |
| 3,949,299 | 4/1976 | Song | 340/347 DA |
| 3,971,987 | 7/1976 | Carrubba et al. | 325/38 B |

FOREIGN PATENT DOCUMENTS

2098528 3/1972 France.
2164413 7/1973 France.
1338633 11/1973 United Kingdom.

OTHER PUBLICATIONS

Schindler, H. R., "Delta Coder", IBM Technical Disclosure Bulletin, vol. 13, No. 8; Jan., 1971, p. 2375.

Primary Examiner—Charles E. Atkinson
Assistant Examiner—Errol A. Krass
Attorney, Agent, or Firm—Townsend and Townsend

[57] ABSTRACT

A digital signal generator that produces multi-frequency tones in the voice band range for use in telephone station sets utilizing multitone dialing. Amplitude information describing each of eight voice band frequencies is digitally encoded into a sequence of multibit words describing the amplitude at successive data points along the waveform. The eight frequencies so encoded are separated into four upper and four lower frequencies and stored in two solid state read-only memories. Upon command amplitude data words for one upper and one lower frequency are sequentially read out of the memory in time synchronization, added, and their sum applied to a digital delta modulation circuit. The delta modulator determines the change between two successive data word sums and describes the change by an output of either a binary one or a binary zero. The delta modulator output thus comprises a series of binary ones and/or zeros forming an aperiodic digital pulse train which is applied to an output module consisting of an integrating network to synthesize an approximation of a multitone dialing waveform which is compatible with the common carrier telephone network.

2 Claims, 16 Drawing Figures

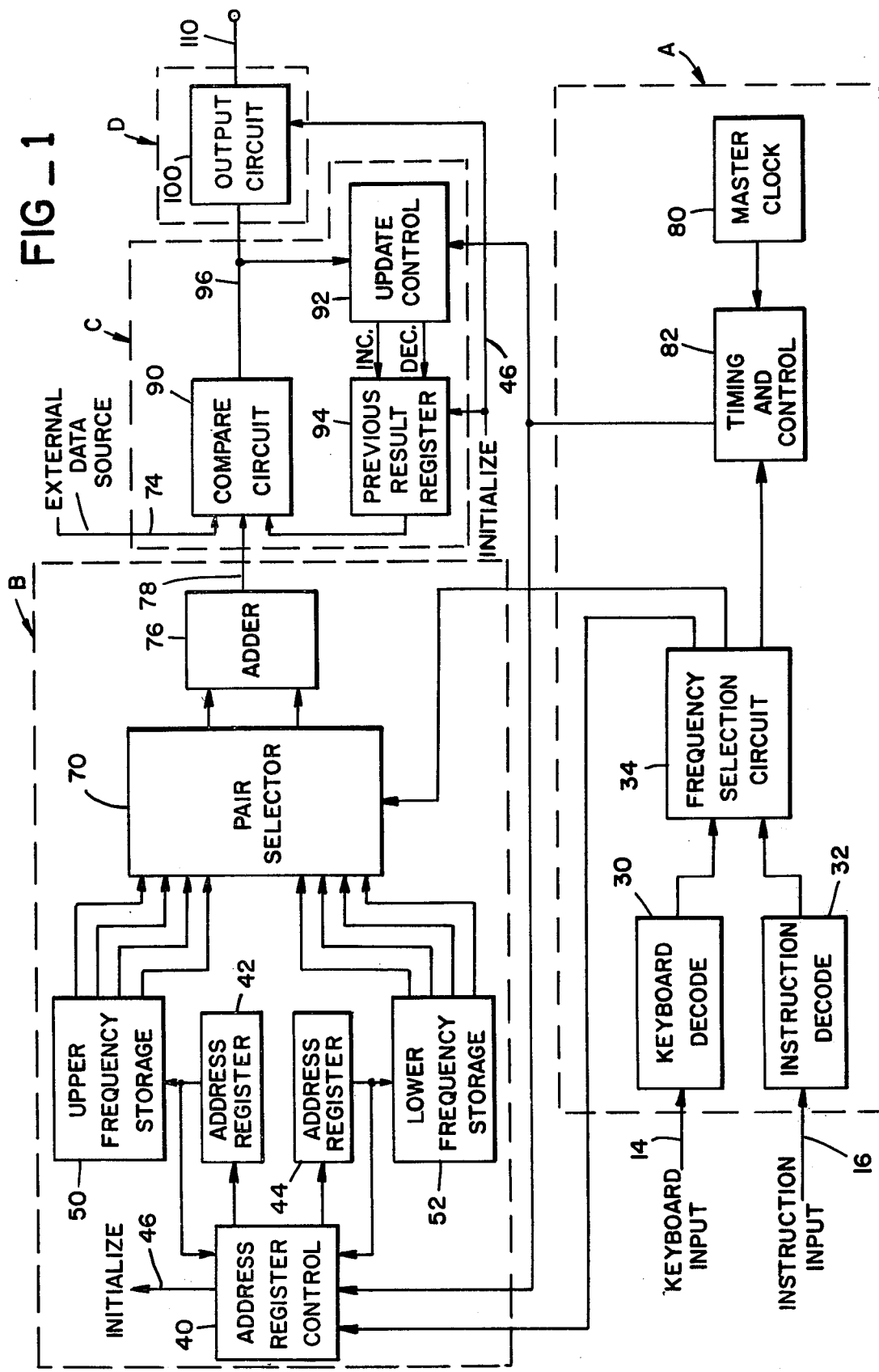

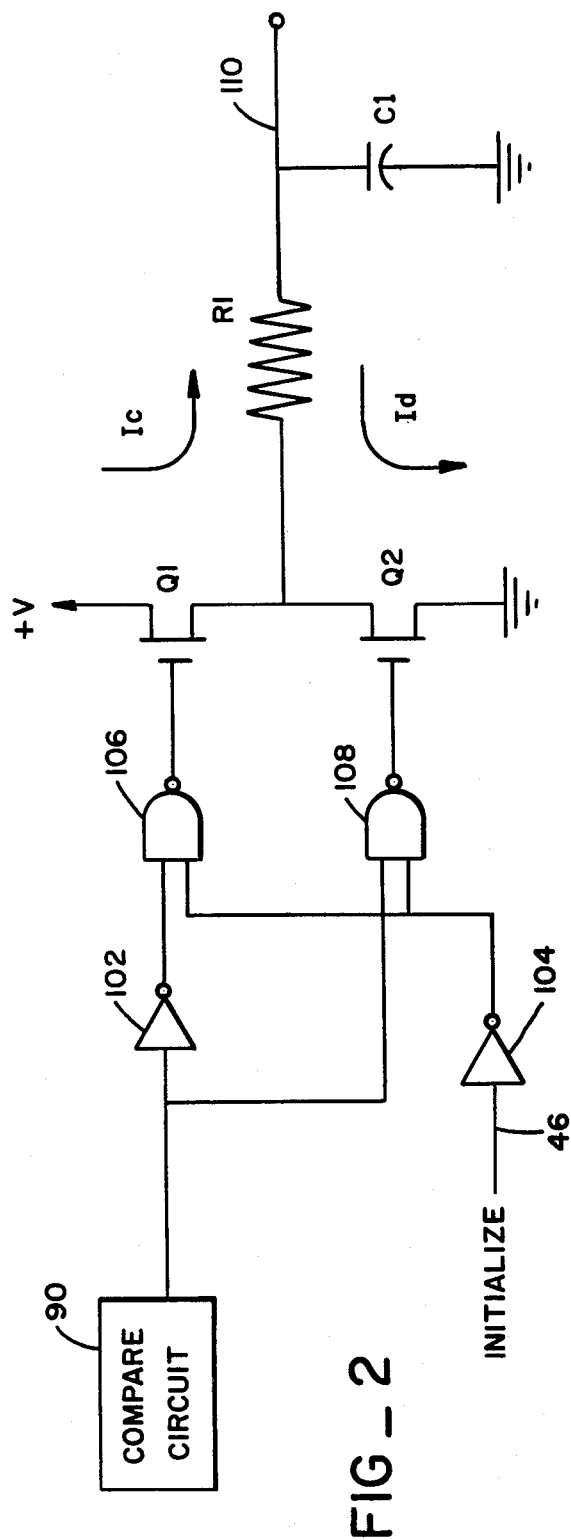
FIG_2
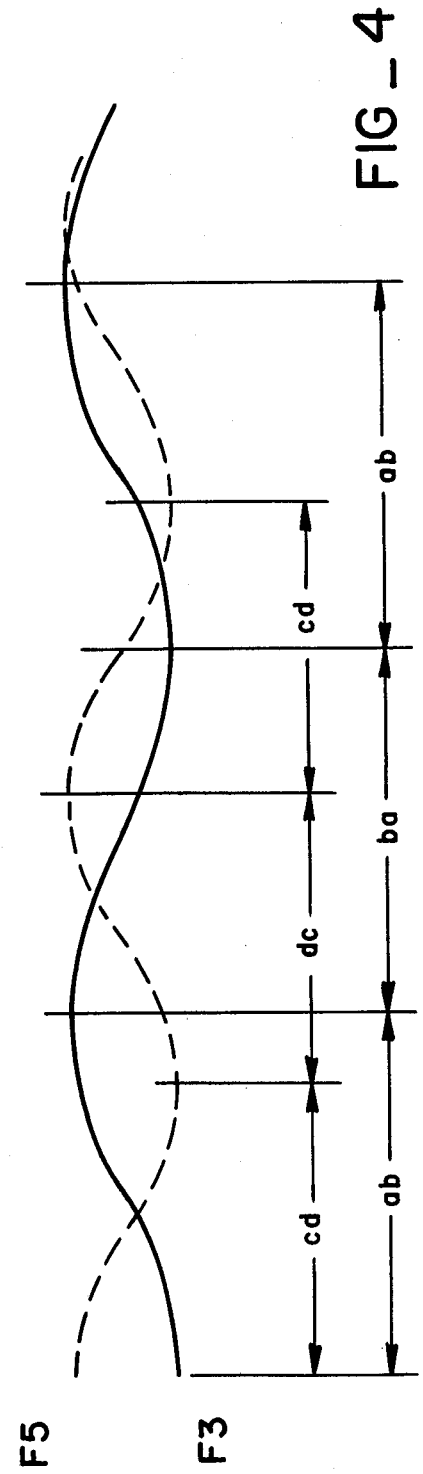
FIG_4

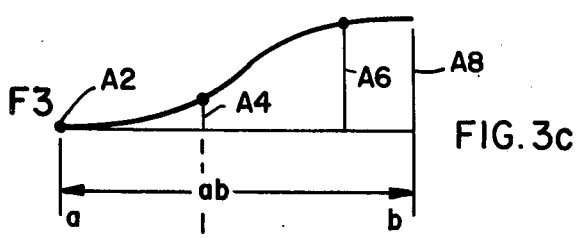
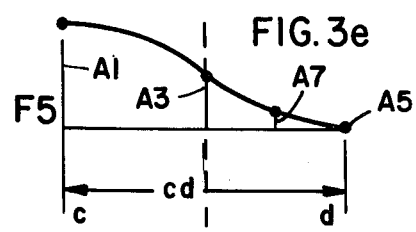
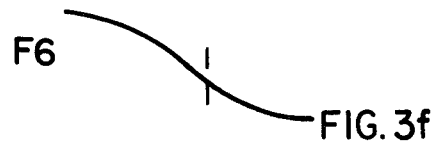
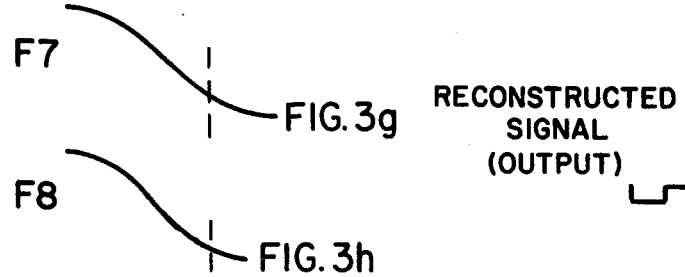
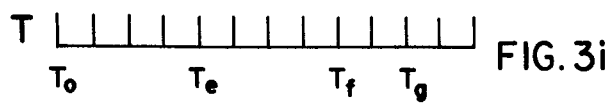
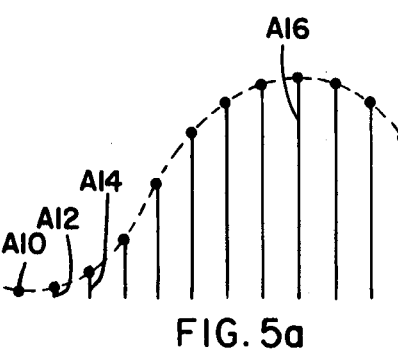
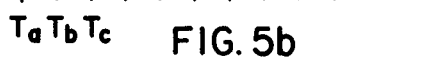
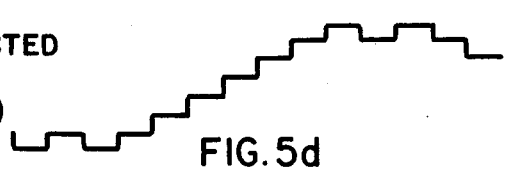

DIGITAL MULTITONE GENERATOR FOR TELEPHONE DIALING

This is a continuation of application Ser. No. 587,453, now U.S. Pat. No. 4,058,805 filed June 16, 1975.

BACKGROUND OF THE INVENTION

1. Field of the Invention

This invention relates, generally, to the field of generation of multivalued waveforms and, more particularly, to a tone generator to be utilized in a multitone multifrequency (MTMF) telephone station set.

2. Prior Art

The majority of telephone station sets in use today which incorporate multitone dialing generate the dialing signals with analog circuitry utilizing discrete components. Such circuitry typically utilizes tuned networks, comprising an inductance coil and a capacitor, each being tuned to one of the particular dialing tones required. Operation of any push button on a keyset causes, through electro-mechanical switching, two corresponding inductor-capacitor networks to be activated and coupled into resonant loops to generate the required component frequencies which are combined to form the multitone dialing signal.

Heretofore, use of such analog circuitry to generate multi-tone dialing signals has entailed certain limitations. For example, relatively large amounts of power are required to excite the two tuned circuits which are selected to generate the required frequencies. Thus, the number of push button multitone dialing sets that may be operated from one central office battery source is correspondingly limited.

Also, it is usually required that the telephone sets be usable despite relatively large temperature variations in the operating environment. Thus, the circuitry employed in the telephone sets to generate the multitone frequencies must maintain relatively constant electrical values throughout a broad range of temperature values. The high quality circuit elements required for generating the relatively error free frequencies required in this type of signaling results in higher manufacturing costs.

Moreover, since the tuned circuits are required to operate in the 700–1700 Hz range, components of rather large size are necessitated. Thus, a large amount of room must be provided in the telephone set for the analog circuitry required to generate the multitone dialing frequencies.

Recently, attempts have been made to utilize digital circuitry in the generation of multitone frequencies. One such circuit, disclosed in U.S. Pat. No. 3,787,836, issued to Hagelbarger uses controlled frequency division, shifting, delaying, and summation in suitable proportions to form approximations of the desired waveform. Such systems, however, require added filtering to remove harmonics generated. This added filtering substantially increases the expense of manufacture.

Digital circuitry, for the most part, can easily be implemented in integrated circuit form and thus manufactured in large volume with the advantages of low temperature sensitivity and small size. Further, such circuitry typically requires less power for operation.

Accordingly, this invention provides a solid state multitone signal generator, utilizing digital circuitry, which can replace existing analog multitone generation networks in use in present telephone sets. Moreover, such utilization of digital circuitry to provide a solid state signal generator will allow the invention to be fabricated in miniaturized form.

Additionally, this invention provides a multitone signal generator that may be operated on substantially less power than that presently required by the analog circuits in use in today's multitone telephone sets.

SUMMARY OF THE INVENTION

The present invention is a digital signal generator that produces a suitable approximation of multitone dialing signals. The digital circuitry comprising the invention may be grouped in four basic functional units or modules. A controller generates the basic command and timing pulses required to synchronize the other modules for generation of a multitone output. The controller receives signals from either the keyboard of a touchtone dialing set or from an external data source in the form of an instruction word to initiate multitone signal generation. The command and timing pulses from the controller are applied to a data source, a delta modulator and an output module.

The data source contains two solid state memories. Stored in these memories for each of the multitone frequencies are a sequence of digitally encoded multi-bit data words representing amplitude values at successive data points along the waveform. Upon receipt of the proper signals from the controller, the data source will sequentially read out the amplitude data words for two selected frequencies in time synchronization, sum them, and apply the sum to the delta modulator.

The delta modulator accepts the summed amplitude data word and compares it to a stored digitally encoded word which is an approximation of the immediately preceding amplitude sum. A determination is made as to whether the current data word sum is greater or less than the "previous result" word. Based upon this determination, one of two binary levels is output from the delta modulator which forms, over a period of time, an aperiodic digital pulse train. Immediately prior to the time the two amplitude values for the successive data point are read out of the memories the previous result approximation is updated by incrementing or decrementing the word by one for use in the subsequent compare step.

The digital pulse train from the delta modulator is applied to the output module. The output module integrates the pulse train by adding or subtracting energy in response to the change in the previous result word. This is typically accomplished by the controlled charging and discharging of a single capacitor through a single resistor. Thus, the output module constructs, from the single bit digital pulse train output from the delta modulator, an analog waveform which is a suitable approximation of a multitone dialing signal compatible with the external telephone system.

BRIEF DESCRIPTION OF THE DRAWINGS

FIG. 1 is a block diagram of the present invention illustrating the flow of data and control signals;

FIG. 2 is an electrical schematic diagram illustrating one implementation of the output circuit of FIG. 1;

FIGS. 3(a)–3(i) are waveform diagrams illustrating the manner in which the amplitude information of the various tone frequencies is stored in the data source of FIG. 1;

FIG. 4 is a waveform diagram illustrating a selected pair of tone frequencies from the data source of FIG. 1; and FIGS. 5(a)–5(d) are pictorial representations of simplified waveforms illustrating the conversion of encoded data words representing amplitude values along a multitone waveform, to an analog output signal approximating that waveform.

DETAILED DESCRIPTION OF THE PREFERRED EMBODIMENT

Referring to FIG. 1, the circuitry required by this invention to generate an appropriate multitone dialing signal may be divided into the four functional circuit modules as indicated by the broken lines. Controller "A" contains the basic command and timing pulses required to synchronize the remaining circuit modules for generation of a multitone output. Controller "A" accepts a command signal either from the keyboard of a touch-tone dialing set when a key is depressed or in the form of an instruction word from an appropriate external source. A signal from either the keyboard or the instruction source upon input lines 14 or 16 respectively causes controller "A" to generate timing and control signals which are applied to data source "B," delta modulator "C," and output module "D." These timing and control signals continue until the key of the station set is released or, if signal generation is initiated by an instruction word, receipt of another instruction word commanding cessation of tone-generating activity.

Upon receipt of the proper signals from controller "A," data source "B" will begin to sequentially transmit to delta modulator "C" a series of digitally encoded data words, describing amplitude values at predetermined time-successive data points along the two selected tone waveforms from which the multitone dialing signal will be formed.

Delta modulator "C" operates upon the received data words to generate a series of binary "ones" and "zeros," high or low voltage levels, respectively, to form an aperiodic digital pulse train containing information describing the dialing waveform to be generated. Output module "D" accepts this digital pulse train from the delta modulator and constructs an accurate analog approximation of the digitally described waveform.

Examining the circuitry within the various functional circuit modules in more detail it will be seen that controller "A" includes keyboard decode circuitry 30 which accepts touch-tone keyboard information for decoding. The decoded information is then applied to the frequency selection circuit 34. Alternatively, an instruction word may be received by the instruction decode circuit 32, from a digital computer or the like, to cause the frequency selection circuit 34 to initiate multitone generation.

One output from frequency selection circuit 34 activates timing and control circuit 82 to begin generating the proper timing and sequencing signals required by the remainder of the system during operation. The proper time base is provided the timing and control circuit 82 by the master clock 80.

Data source "B" comprises read-only memories (ROMs) 50 and 52 which each contain a number of six-bit data words that describe the amplitude values of the several "standard" sinusoidal waveforms necessary to generate a multitone dialing signal, at predetermined time-successive data points along the waveforms. ROMs 50 and 52 are respectively addressed by address registers 42 and 44 which are eight-stage counters capable of sequentially counting up, or down, and being preset to contain address zero.

Address counters 42 and 44 are provided the digital pulses to count up or down by the address register control 40. Additionally, upon receipt of the appropriate signal, the register control 40 will clear the address registers, thereby causing them to be preset to contain the address zero. Further, address register control 40 contains conventional logic circuitry which monitors the outputs of address counters 42 and 44 and compares these outputs to address information presented to register control 40 by frequency selection circuit 34. When address counter 42 or 44 reaches the quantities presented by selection circuit 34, the address register control 40 causes such address counter to begin counting downward.

ROMs 50, 52 each have 24 output lines, divided into four sets of six output lines each. The output lines of ROMs 50, 52 are applied to pair selector 70 which, under the control of frequency selection circuit 34, selects one set of output lines from the four sets of lines presented by each of the ROMs 50 and 52. The two sets of lines thus selected are connected to adder 76 which sums the two data words as they appear on the output lines from the pair selector and applies the sum, a seven-bit data word, to compare circuit 90 of delta modulator "C."

In addition to the compare circuit 90, the delta modulator "C" contains a previous result register 94 and an update control circuit 92, which causes the previous result register 94 to be incremented or decremented by one. The previous result register 94 is a seven stage up-down counter containing a digitally created approximation of the summed data word that appeared on line 78 immediately prior in time to the appearance of the summed data word presently applied to compare circuit 90. Update control 92 updates the previous result register 94 by either incrementing or decrementing by one the contents of the previous result register 94, based upon whether said contents are less or greater in magnitude than the seven-bit sum from adder 76.

At the outset, data register 94 is preset by an appropriate pulse from controller "A," to contain a predetermined seven-bit quantity. This quantity is compared, by compare circuit 90, to the initial data word output from data source "B." If the result of this compare is that the data word is small than the contents of the data register 94, the output of the compare circuit 90 assumes a low voltage level or a binary "zero." If the opposite is true, the compare circuit 90 output assumes a higher voltage denoting a binary "one."

As succeeding timing pulses are presented to the data source "B," causing two six-bit data words to be sequentially applied to adder 76, the seven-bit sums from the adder 76 are sequentially applied to compare circuit 90. Over a period of time compare circuit 90 will output an aperiodic digital pulse train which is applied to output circuit 100. Output circuit 100 constructs, through controlled charging or discharging of a capacitor, a multi-valued waveform suitably approximating the multitone dialing signal desired.

Referring now to FIG. 2, the circuitry contained in output circuit 100 will be described. The output circuit has included therein inverters 102 and 104, NAND gates 106 and 108, field effect transistors (FETs) Q1 and Q2, and the integrating network of R1 and C1. As can be seen the output circuit 100 receives, in addition to the input from compare circuit 90, an initialize pulse presented on input line 46. This pulse will be described below in connection with the overall operation of the multitone generator. It is sufficient now to state that the input 46 is normally at a low voltage level, a digital zero, during multitone generation.

FETs Q1 and Q2 form a voltage dividing network to control charge or discharge of capacitor C1 through resistor R1, depending upon which FET is on at any particular time. Since Q1 is tied directly to a positive voltage source, +V, turning on Q1 and keeping Q2 off will allow the capacitor C1 to charge towards +V. Alternately, turning Q1 off and Q2 on will allow the capacitor C1 to discharge through the resistor R1 and the resistance presented by the FET Q2.

FETs Q1 and Q2 are turned on or off to charge or discharge the capacitor C1 in response to the output of the compare circuit 90. If the output of compare circuit 90 is a binary one, output inverter 102 assumes a low which is applied to the NAND gate 106. This will cause the output of the NAND gate 106 to become a binary one, a voltage level sufficient to turn on the FET Q1. The binary one applied to gate NAND 108 from compare circuit 90 in conjunction with the binary one presented to gate NAND 108 by the inverter 104 (since the initialize line 46 is low), causes the output of the gate 108 to assume a binary zero or low voltage which will be sufficient to hold the FET Q2 in an off condition. Thus, the capacitor C1 will be charged by a current through FET Q1 and resistor R1.

Alternatively, a binary zero out of the compare circuit 90 will cause inverter 102 to present a binary one to the NAND gate 106. This binary one, in conjunction with the binary one presented thereto by the inverter 104, causes the output of the NAND gate 106 to become a binary zero, a voltage level sufficient to turn off the FET Q1. The binary zero out of compare circuit 90 causes the output of the gate 108 to assume a binary one which will be sufficient to turn on the FET Q2. Thus, the capacitor C1 will be allowed to discharge through the resistor R1 and the FET Q2 during whatever time the FET Q2 is held in the on condition.

Referring now to FIGS. 3(a)-3(i) and 4, the operation of the ROMs 50 and 52 and their contents will be more fully understood. Generation of a multitone signal for dialing requires the combination of two tones, one high-band and one low-band frequency, to create the appropriate dialing signal. Thus, stored in ROM 50 are four sequences of data words describing successive amplitude values for the four required high-band frequencies, represented by the waveforms F5 through F8 of FIGS. 3(a)-3(h). Similarly, ROM 52 contains data words embodying the amplitude information for the low-band frequencies, represented by the waveforms F1 through F4 (FIGS. 3(a)-3(d).

The peak amplitudes of the waveforms are identical and the amplitude value at any particular data point is described by a six-bit word. The minimum amplitude value is described by the six-bit word (000 000). Similarly, the maximum amplitude value of any particular waveform is described by the six-bit word (111 111). The remaining amplitude values of the various waveforms vary between these two six-bit word values.

Data words describing the four lower frequencies are contained in ROM 52 with the data word describing the minimum amplitude value for each lower frequency contained in address zero of the ROM 52. As the illustrations of frequencies F1-F4 of FIGS. 3(a)-3(d) indicate, the amplitude values contained in the data words increase as their address location in ROM 52 increases. As the address sequentially increases, the data words describing the increasing amplitude values of the waveforms are sequentially presented to the ROM output.

It may be seen, by reference to FIGS. 3(a)-3(h), that only the half period of each of the four low frequency waveforms extending from the minimum amplitude value to the maximum amplitude value is required to generate a full cycle. For example, as indicated on the waveform representation F3 of FIG. 3(c), the ROM 52 is sequentially addressed by the address register 44 from the starting address containing the data word describing amplitude value A2 at point "a" (i.e. 000 000) up to and including the amplitude value A8 at point "b."

Thus, the half-cycle of amplitude values from data point "a" to data point "b," or interval "ab," of F3 would initially be output from ROM 52 (as would the amplitude values of F1, F2 and F4). At this point the counter of address register 44 is commanded to count sequentially downward, thereby addressing the data words in reverse order until the address containing the data word A2 is again reached. The half-cycle of amplitude values from point "b" to point "a," or "ba," of F3 would then be output from ROM 52, thereby making a full-cycle of amplitude values for F3 composed of "ab" and "ba." Continuing such cycling and recycling of address register 44 to address the ROM 52 will output therefrom in a sequential manner the amplitude values of the four lower frequencies.

The operation of ROM 50 and address register 42 are identical. Therefore, using the waveform representation F5 of FIG. 3(e) as an example, amplitude values from "c" to "d," or "cd," are initially sequentially output from ROM 50. Reversal of address register 42 will cause amplitude values from "d" to "c" or "dc" to be output from ROM 50. However, as the illustrations of the upper-band frequencies F5 through F8 of FIGS. 3(e)-3(h) depict, the starting address (i.e. first data point) of ROM 50 contains a six-bit word describing the maximum amplitude value of any upper-band frequency. As ROM 50 is sequentially addressed upward, the upper-band amplitude values decrease.

FIG. 4 illustrates the combination of the half-cycles of amplitude values in intervals "ab" and "ba" of F3, as well as amplitude values in intervals "cd" and "dc" of F5, to construct a periodic procession of amplitude values.

The amplitude values describing the waveforms contained in ROMs 50 and 52 are accessed with the same frequency. This requires a different number of data words to describe the amplitude values of one cycle of each individual frequency. It has been found that at an addressing rate of 238.66 KHz, a preferred number of data points for the four lower-band frequencies are 127, 140, 155 and 171. The number of data words used for the upper-band frequencies are 73, 81, 87 and 99. Thus, the highest frequency will contain the fewest number of data words describing its amplitude waveform while the lowest frequency will include the highest number of data words.

When ROMs 50 and 52 are addressed by address registers 42 and 44, respectively, the specific data words corresponding to the address are output from the ROMs for all eight frequencies. However, as described above, pair selector 70 utilizes conventional logic circuitry, operating under control of the frequency selection circuit 34, to select one set of six output lines from ROM 50 and one set of six output lines from ROM 52. The signals on the output lines thus selected are applied to adder 76 for binary addition. The output of the adder 76, therefore, presents to the compare circuit 90 of the delta modulator "C" a seven-bit data word describing the sum of the amplitude value for one upper-band frequency at a particular data point and the amplitude value for a lower-band frequency at the same (time-wise) data point.

OPERATION

Activation of the multitone generator results from receipt of a command signal from a telephone set keyboard, received on keyboard input 14 by the keyboard decode circuit 30. Alternatively, multitone generation may also result from receipt of an instruction word over instruction input line 16 by the instruction decode circuit 32. The command, be it presented to the circuit of FIG. 1 via input 14 or 16, is decoded by conventional logical circuitry such that the output from the decode circuits 30 or 32 specify a particular pair of tones to be generated from the eight available frequencies.

Upon activation, the timing and control circuit 82 applies to the address register control 40 an initial pulse, before actual operation begins, to allow the address register control 40 to preset address registers 42 and 44 to their starting addresses, i.e., address zero. Additionally, this initial pulse causes address register control 40 to generate an initialize pulse on line 46.

The initialize pulse appearing on line 46 is applied to the previous result register 94 to load it with a predetermined quantity for comparison with the first amplitude sum presented to compare circuit 90 by the adder 76.

The initialize pulse from address register control 46 is also applied to output circuit 100 of FIGS. 1 and 2. Referring to FIG. 2, it can be seen that when the initialize pulse appears on line 46, which will be a binary one, the output of inverter 104 will be a binary zero. When the output of inverter 104 is applied to NAND gates 106 and 108, their outputs both assume a binary one causing FETs Q1 and Q2 to turn on. As can be seen, with FETs Q1, Q2 on, a voltage divider configuration is presented to the resistor-capacitor network of R1, C1; it is therefore preferable that FETs Q1 and Q2 are selected such that their impedances are nearly equal.

Turning FETs Q1 and Q2 on simultaneously allows the capacitor C1 to charge to a mid-level voltage representative of the multi-tone signal created by the sum of one low-band frequency and one high-band frequency at a data point when the high-band frequency is at its maximum amplitude value and the low-band frequency is at its minimum amplitude value.

The time period required for the initialize pulse to be present upon line 46 is determined by the time required to charge (or discharge) the capacitor C1 to a mid-level voltage value.

Once initial conditions have been set, the timing and control circuit 82 now begins to provide a periodic pulse train to the address register control 40. The address control 40 applies this pulse train to address registers 42 and 44, causing them to count upward to sequentially address the ROMs 50 and 52.

Referring again to FIGS. 3(a)–3(i) and 4, assume that one of the inputs 14 or 16 required generation of a multi-tone signal composed of the amplitude values describing the low-band waveform F3 and the high-band waveform F5 of FIGS. 3(c) and 3(e), respectively. After the proper initialization is complete and at time $T_o$, address registers 42 and 44 contain, and therefore are addressing, address zero. Each of the four sets of output lines from ROM 50 have appearing thereon six-bit data words describing the maximum amplitude values for frequencies F1 through F4. However, under the control of frequency selection circuit 34, the pair selector selects only those two sets of output lines having thereon the six-bit data words for F3 and F5 to be applied to the adder 76.

Appropriate timing pulses are then applied to address counters 42 and 44 causing them to sequentially count up and thereby address ROMs 50 and 52 in a sequential manner. At time $T_e$, FIG. 3(i) for example, the six-bit data words appearing on the output of pair selector 70 will, for F3, describe amplitude value A4 and, for F5, describe the amplitude A3, as shown in FIGS. 3(c) and (e), respectively.

At time $T_f$ of FIG. 3, it can be seen that F5 has reached its minimum amplitude value A5, while F3 is at amplitude level A6. At this point address counter control 40, which has been comparing the address counter outputs with appropriate input from frequency selection circuit 34, determines that address counter 42 has reached the upper limit of storage for the data words containing the amplitude points of frequency F5. Address counter control 40 reverses the up/down command controls so that further pulses to address counter 42 will cause it sequentially count down from the quantity it now contains. ROM 50 will be addressed in reverse such that the amplitude values for F5 proceed from the minimum amplitude A5 to the maximum amplitude A1. Similarly, at time $T_g$ the upper limit address is reached for peak amplitude A8 of F3. The direction of address counter 44 then is reversed so that further pulses applied thereto will cause it to count downward to address storage locations of ROM 52 in a reverse order.

A similar reversal of counter direction occurs when address counters 42 and 44 again reach address zero, causing them to count up. Thus, address counters 42 and 44 continue to cycle up and down addressing the amplitude values at data points describing the half cycles of waveforms F3 and F5 while the adder 76 sees data words describing amplitude levels for the periodic waveforms indicated in FIG. 4.

The data words are summed by adder 76 as they appear on the output of the pair selector 70. The output of the adder 76 is a sequential series of seven-bit data words which are applied to the compare circuit 90.

Referring now to FIGS. 5(a)–5(d), the seven-bit data words applied to the delta modulator and their use in synthesizing an aperiodic digital pulse train and subsequent multitone signal approximation may now be described.

FIG. 5(a) represents a multitone waveform with specific predetermined amplitude levels denoted thereon. Each amplitude level denoted on FIG. 5(a) is the seven-bit sum of two six-bit data words applied to adder 76. The seven-bit data words from adder 76 have a minimum amplitude corresponding to the sum of the two minimum amplitude values from ROMs 50 and 52. Thus, amplitude A10 of FIG. 5(a) would be represented by the data word (0000000) while the maximum amplitude A16 would be represented by the data word (1111110). The amplitude levels at the remaining data points are described by data word quantities varying between these two values.

With a number of such data words capable of being output from the data source "B," timing pulses are supplied by control module "A" to cause data source "B" to sequentially output data words. Thus, when timing pulses $T_a$, $T_b$ and $T_c$ are applied to the data source "B," data words describing amplitude points A10, A12, and A14 are sequentially presented by the data source to delta modulator "C."

At the outset, the data register 94 is preset by the initialize pulse appearing on line 46, to contain a predetermined seven-bit quantity. This quantity is compared, by compare circuit 90, to the initial outputted data word from adder 76 of data source "B." If the data word from adder 76 is smaller than the contents of the data register 94, the output of the compare circuit 90 becomes a binary zero. If the opposite is true, the compare circuit 90 output becomes a binary one.

Assume for the moment that previous result register 94 contains a seven-bit word, the quantity of which is less than the quantity of the seven-bit word now appearing on the output of the adder 76. Compare circuit 90 will output a binary zero, based upon a comparison of the seven-bit words applied to it by adder 76 and previous result register 94. The next timing pulse from timing and control circuit 82, which will cause the address registers 42 and 44 to proceed to the next sequential address of ROMs 50 and 52, will also be applied to the prior result control 92. The prior result control detects the binary one output from the compare circuit and, in response to the timing pulse then applied, increments the previous result register 94; the previous result register is thereby "updated." Alternately, if the compare circuit 90 had output a binary zero, indicating the output of adder 76 to be less than the contents of the previous result register, the prior result control 92 would, in conjunction with the appropriate timing pulse from timing and control circuit 82, decrement by one the previous result register.

As a series of seven-bit words from the adder 76 is presented to the compare circuit 90, a series of comparisons will be made resulting in an output from the compare circuit 90 of either a binary one or a binary zero. This process of outputting data words from data source, comparing, and updating is continued causing, over a period of time, the compare circuit 90 to output an aperiodic pulse train illustrated in FIG. 5(c).

The aperiodic pulse train so created is applied to output module "D" which, through the controlled charging of a capacitor explained above, presents at the output 110 a reconstructed signal having an amplitude proportional to the waveform described by the data words sequentially output from the data source "B" and a frequency proportional to the frequency of the timing pulses. Such an output waveform is illustrated by FIG. 5(d).

Thus, it is apparent that there has been described in accordance with the invention, a multitone generating circuit utilizing digital circuitry that fully satisfies the objects set forth above. While the invention has been described in conjunction with a specific embodiment thereof, it is evident that many alternatives, modifications, and variations will be apparent to those skilled in the art in light of the foregoing description.

For example, the delta modulator module "C" may alternatively receive data words describing a multi-valued waveform from an outside source, as indicated on FIG. 1 by input line 74. Accordingly, the description of this invention is intended to embrace all such alternatives, modifications, and variations as fall within the spirit broad scope of the appended claims.

I claim:

1. A digital delta modulator comprising:
    comparator means for generating a digital pulse train in response to a series of comparisons of the value of a first multi-bit data word representing the amplitude of an analog waveform at a particular sample time and the value of a second multi-bit data word representing an approximation of the amplitude of said waveform at an immediately preceding sample time;
    data source means for supplying said first data words to one input of said comparator; and
    memory means responsive to the output of said comparator for generating said second data word therefrom and providing said data word to another input of said comparator, said memory means including binary counting means responsive to said digital pulse train for incrementing or decrementing the contents thereof to cause generation of said second data word, whereby said digital pulse train reflects the time sequential change in value between successive ones of said first data words.

2. The digital delta modulator of claim 1, wherein said comparator means outputs a single bit at a first level when a comparison of said first multi-bit data word determines said first data word to be greater than said second multi-bit data word and outputs a single bit at a second level when a comparison of said first multi-bit data word determines said first multi-bit data word to be smaller than said second multi-bit data word.

* * * * *